United States Patent
Kuperman

(10) Patent No.: US 11,560,945 B2
(45) Date of Patent: Jan. 24, 2023

(54) TRANSMISSION COOLER THERMAL BYPASS DEVICE

(71) Applicant: Frank C. Kuperman, Charlotte, NC (US)

(72) Inventor: Frank C. Kuperman, Charlotte, NC (US)

(73) Assignee: RevMax Performance, LLC, Charlotte, NC (US)

( * ) Notice: Subject to any disclaimer, the term of this patent is extended or adjusted under 35 U.S.C. 154(b) by 0 days.

(21) Appl. No.: 17/405,493

(22) Filed: Aug. 18, 2021

(65) Prior Publication Data

US 2021/0381592 A1 Dec. 9, 2021

Related U.S. Application Data

(63) Continuation of application No. 16/688,326, filed on Nov. 19, 2019, now Pat. No. 11,137,070.

(51) Int. Cl.
| | | |
|---|---|---|
| *F16H 59/14* | (2006.01) | |
| *F16H 57/04* | (2010.01) | |
| *F01M 5/00* | (2006.01) | |
| *F16H 61/4043* | (2010.01) | |
| *F01P 11/08* | (2006.01) | |

(52) U.S. Cl.
CPC .......... *F16H 61/4043* (2013.01); *F01P 11/08* (2013.01); *F16H 57/0413* (2013.01); *F01P 2060/045* (2013.01)

(58) Field of Classification Search
CPC ........... F16H 2059/147; F16H 57/0413; F16H 57/0412; F16H 57/0416; F28D 2021/0089; F28D 2021/008; F01M 5/002
See application file for complete search history.

(56) References Cited

U.S. PATENT DOCUMENTS

| | | | |
|---|---|---|---|
| 5,165,468 A | * | 11/1992 | Tajima .................... B60K 11/04 165/47 |
| 9,133,952 B2 | | 9/2015 | Lamb et al. |
| 9,835,060 B2 | | 12/2017 | Gooden |
| 10,132,401 B2 | | 11/2018 | Gooden |
| 2004/0173341 A1 | * | 9/2004 | Moser ........................ F28D 7/08 165/148 |
| 2005/0006078 A1 | * | 1/2005 | Jeong .................. F16H 57/0415 165/153 |
| 2011/0061744 A1 | * | 3/2011 | Zillig ...................... F16K 11/22 137/15.01 |
| 2011/0296824 A1 | | 12/2011 | Jackson et al. |

(Continued)

FOREIGN PATENT DOCUMENTS

KR 10-2009-0112867 A 10/2009

OTHER PUBLICATIONS

Prior Art Figures 1-3.

*Primary Examiner* — Long T Tran
(74) *Attorney, Agent, or Firm* — Nexsen Pruet, PLLC; Seth Hudson

(57) ABSTRACT

A transmission cooler thermal bypass device that includes a body having a front side, a back side, a top side, and a bottom side. A first opening, a second opening, a third opening, and a fourth opening, whereby a first passageway connects the first opening and the second opening, and a second passageway connects the third opening and the fourth opening. At least one fin. The first passageway and the second passageway do not include a flow control valve.

12 Claims, 9 Drawing Sheets

(56) References Cited

U.S. PATENT DOCUMENTS

| | | |
|---|---|---|
| 2014/0027099 A1 | 1/2014 | Sispera et al. |
| 2014/0251579 A1 | 9/2014 | Sloss |
| 2015/0096729 A1* | 4/2015 | Dziubinschi ............ F28F 27/02 165/173 |
| 2015/0168274 A1 | 6/2015 | Sheffield |
| 2016/0215664 A1* | 7/2016 | Boyer ....................... F01P 3/12 |
| 2018/0031111 A1* | 2/2018 | Mehravaran ............ F28F 27/02 |
| 2018/0274406 A1* | 9/2018 | Dries .................... F01M 5/007 |
| 2019/0284973 A1 | 9/2019 | Kim et al. |

* cited by examiner

TRANSMISSION COOLER THERMAL BYPASS DEVICE

CROSS REFERENCE TO RELATED PATENT APPLICATION

The present patent application is a continuation of U.S. patent application Ser. No. 16/688,326 filed on Nov. 19, 2019 titled "TRANSMISSION COOLER THERMAL BYPASS DEVICE", the contents of which are incorporate in full by reference herein.

FIELD OF THE INVENTION

The present invention relates generally to transmission cooler thermal bypass device and more generally relates to a transmission cooler thermal bypass device that does not incorporate an actuator, spring valve, or flow control valve and contains fins for thermal cooling.

BACKGROUND OF THE INVENTION

Transmission cooler thermal bypass devices are used with a transmission to create a flow path for receiving and transporting fluid from a heat source to a cooler. Once the fluid is cooled, the transmission cooler thermal bypass creates a path for receiving and transporting the fluid from the cooler to the heat source and/or gear box.

A prior art transmission cooler thermal bypass device is illustrated in FIGS. 1-3. The prior art transmission cooler thermal bypass device contains a flow control valve and does not contain fins. The flow control valve is a necessity for the prior art transmission cooler thermal bypass devices. It is an object of the present invention to provide a transmission cooler thermal bypass device that does not use a flow control valve, or any other actuator or spring valve. It is a further object of the present invention to provide a transmission cooler thermal bypass device that includes fins.

BRIEF SUMMARY OF THE INVENTION

According to an embodiment of the present invention, a transmission cooler thermal bypass device includes a body having a front side, a back side, a top side, a bottom side, a first opening, a second opening, a third opening, and a fourth opening. The first passageway connects the first opening and the second opening, and a second passageway connects the third opening and the fourth opening. The first passageway and the second passageway does not include a flow control valve.

According to another embodiment of the present invention, a transmission cooler thermal bypass device includes at least one fin.

According to yet another embodiment of the present invention, a transmission cooler thermal bypass device includes an internally threaded first opening, second opening, third opening, and fourth opening.

According to yet another embodiment of the present invention, a transmission cooler thermal bypass device includes a second passageway that is angled upwards from the third opening to the fourth opening.

According to yet another embodiment of the present invention, a transmission cooler thermal bypass device includes a plurality of fins.

According to yet another embodiment of the present invention, a transmission cooler thermal bypass device includes at least one fin extending from an outer surface of the first side of the body.

According to yet another embodiment of the present invention, a transmission cooler thermal bypass device includes a plurality of fins extending from an outer surface of the first side of the body.

According to yet another embodiment of the present invention, a transmission cooler thermal bypass device includes According to yet another embodiment of the present invention, a transmission cooler thermal bypass device includes According to yet another embodiment of the present invention, a transmission cooler thermal bypass device includes a body having a front side, a back side, a top side, a bottom side, a first opening, a second opening, a third opening, and a fourth opening. A first passageway connects the first opening and the second opening, and a second passageway connection the third opening and the fourth opening. The device includes at least one fin.

According to yet another embodiment of the present invention, a transmission cooler thermal bypass device includes a body having a front side, a back side, a top side, a bottom side, a first opening, a second opening, a third opening, and a fourth opening. A first passageway connects the first opening and the second opening, and a second passageway connects the third opening and the fourth opening. The device includes at least one fin and the first passageway and the second passageway do not include a flow control valve.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
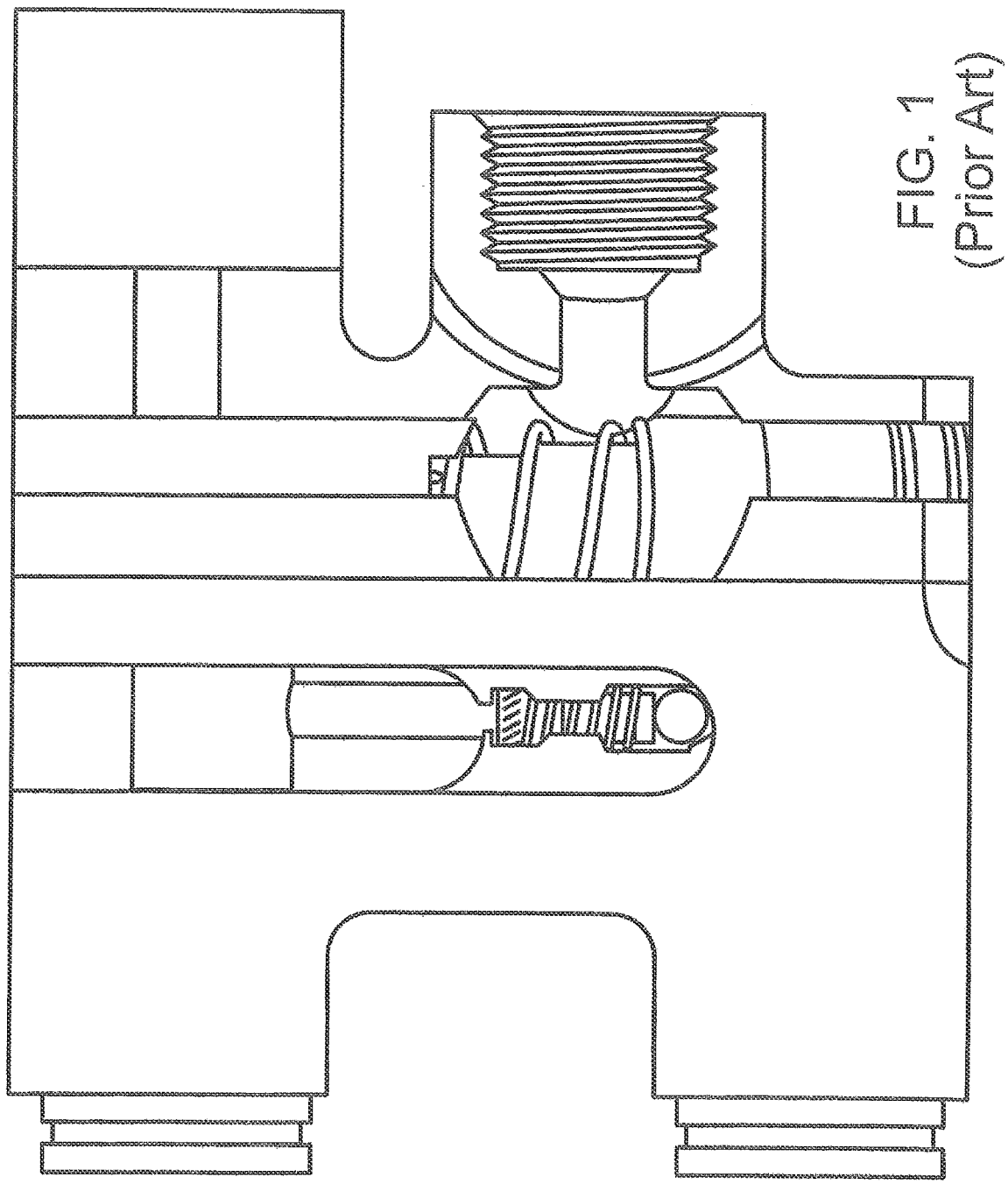
FIG. 1 is a cut-away view of a prior art transmission cooler thermal bypass device.
Figure 2:
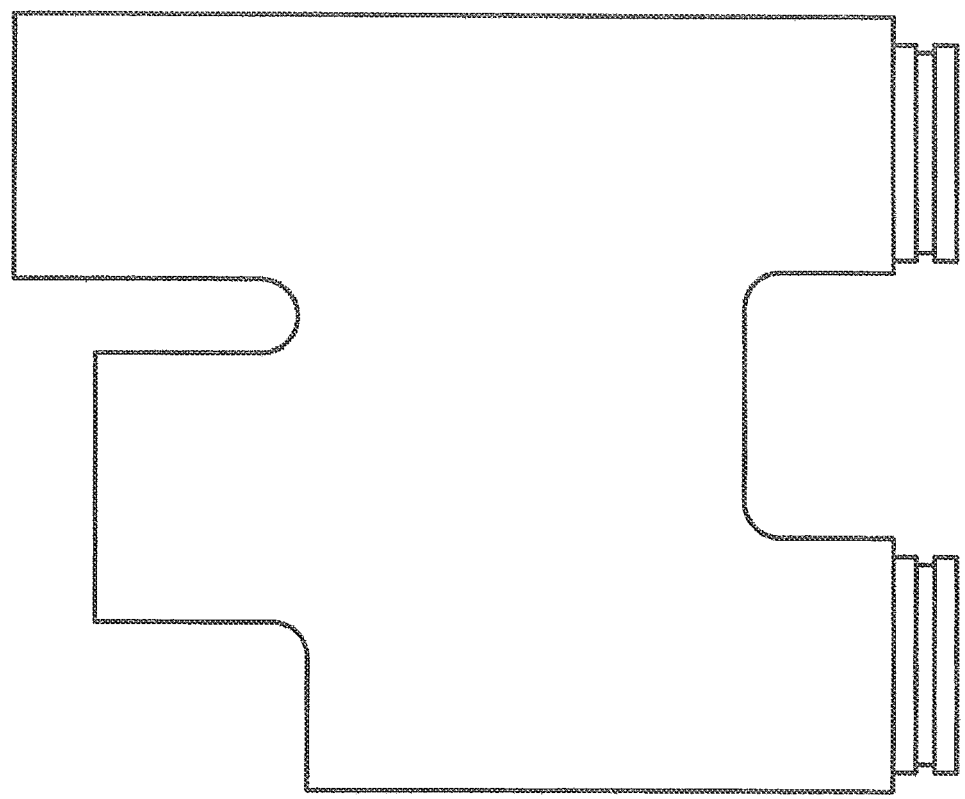
FIG. 2 is a front view of a prior art transmission cooler thermal bypass device.
Figure 3:
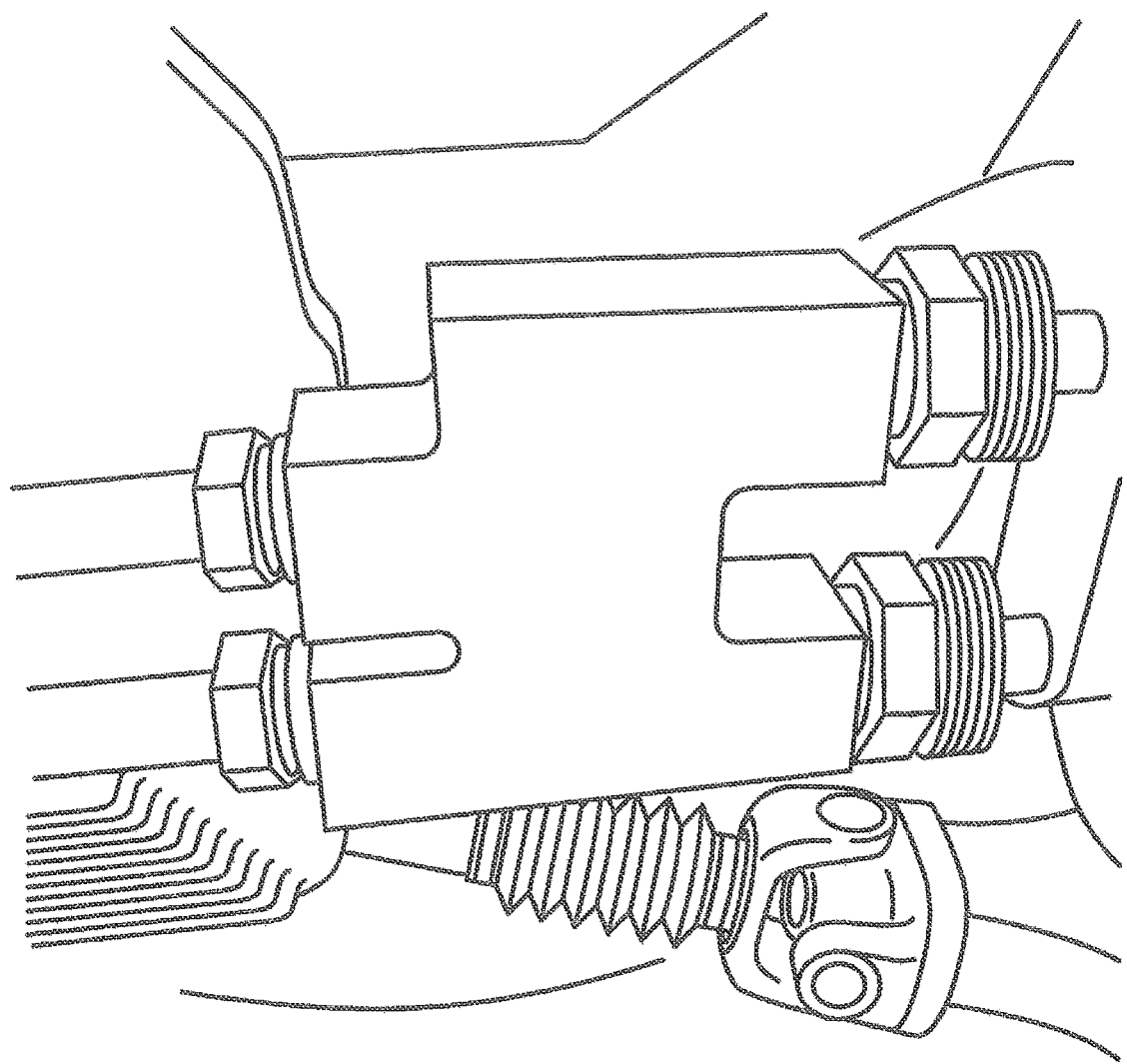
FIG. 3 is a front perspective view of a prior art transmission cooler thermal bypass device.
Figure 4:
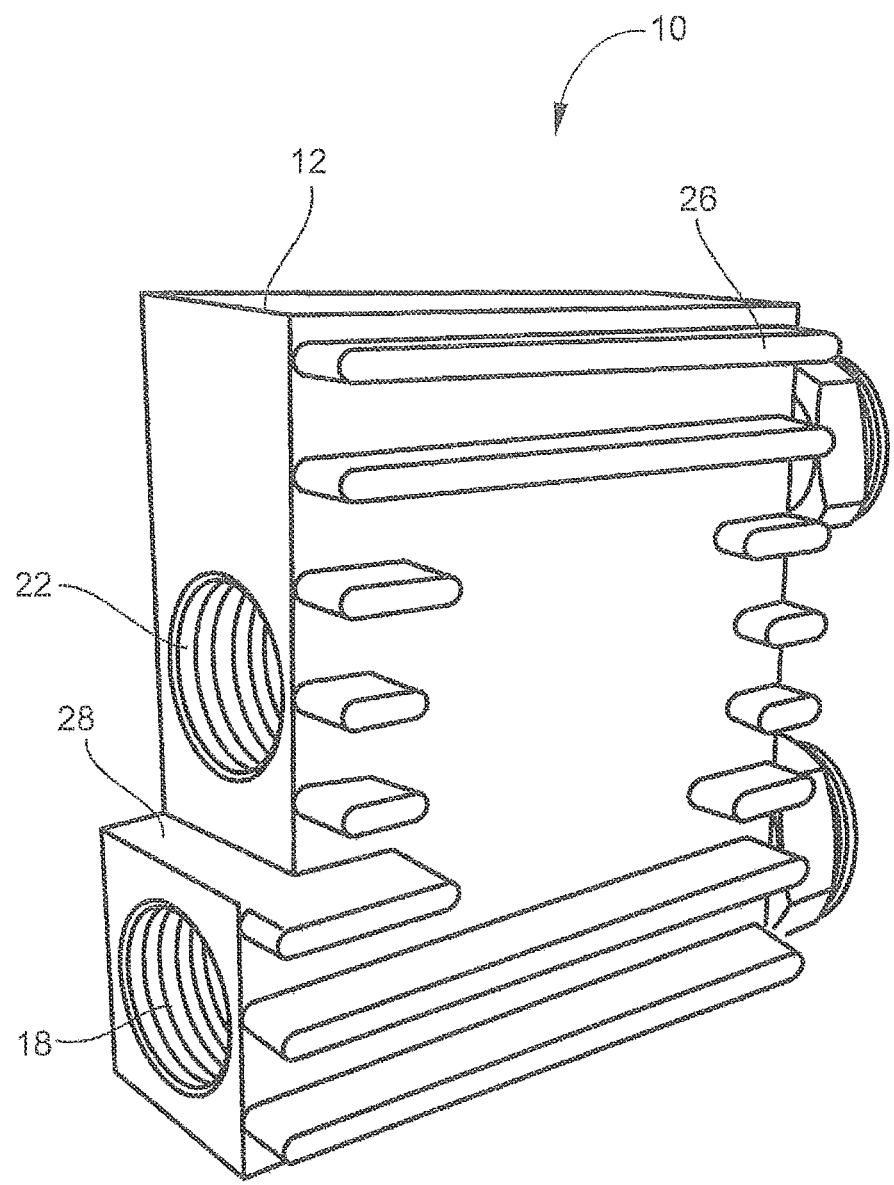
FIG. 4 is a perspective view of the transmission cooler thermal bypass device of the present invention.
Figure 6:
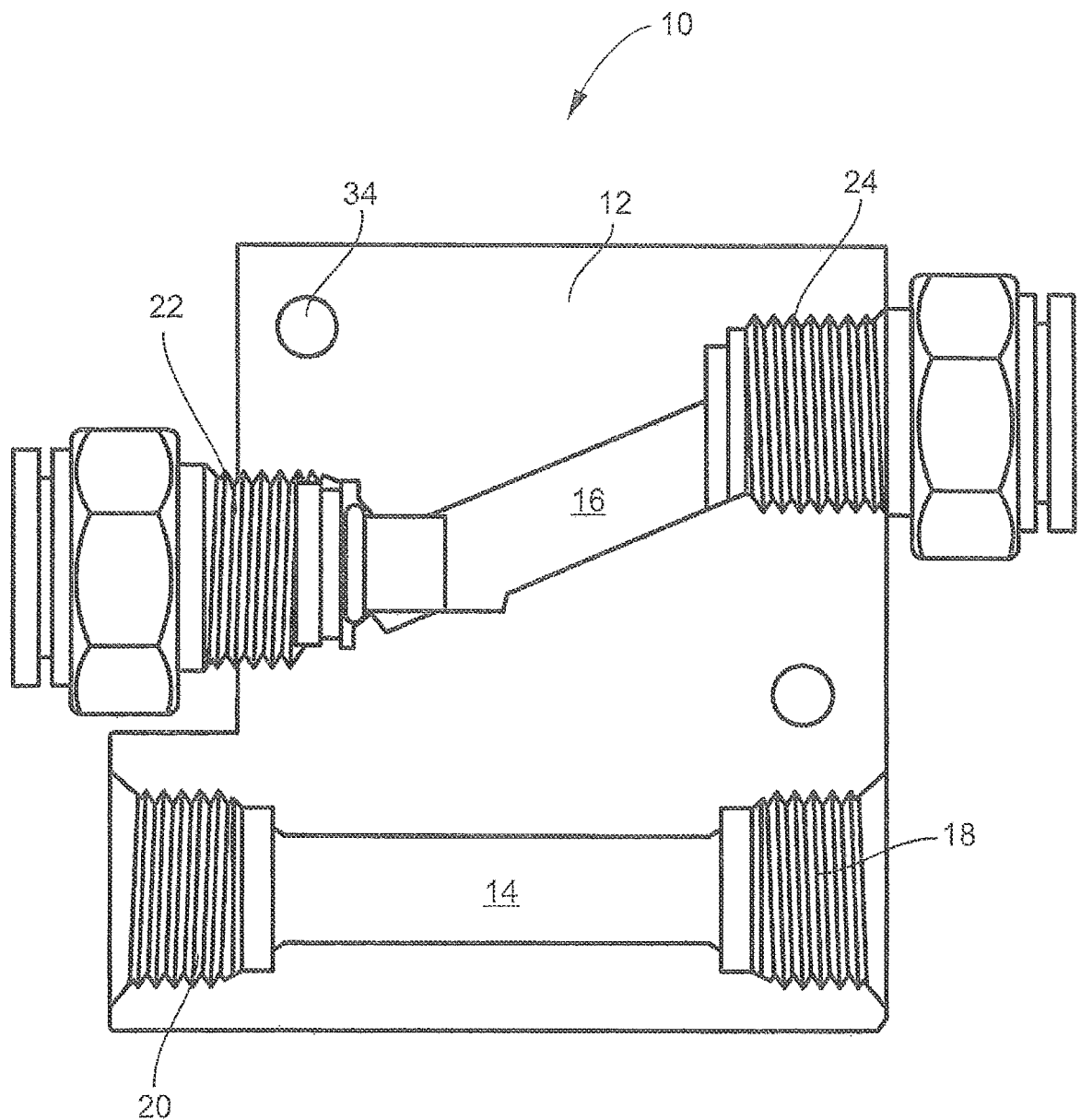
FIG. 6 is a cut-away view of the transmission cooler thermal bypass device showing the openings and the passageways in the body.
Figure 7:
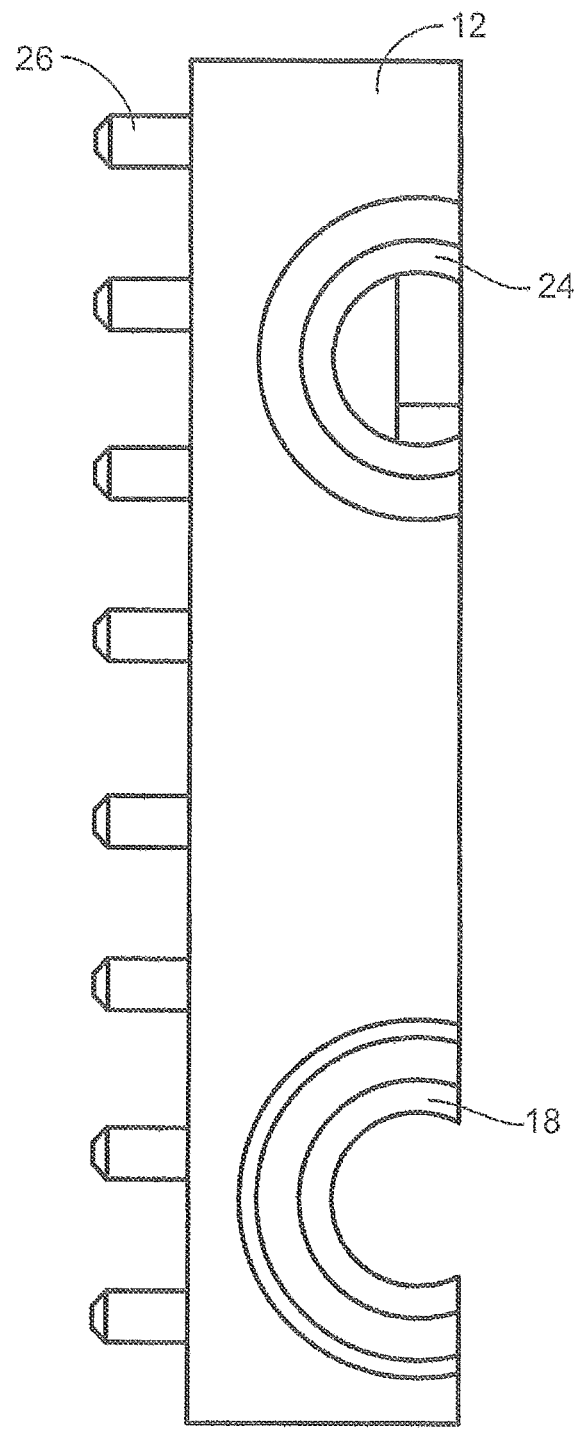
FIG. 7 is a side cut-away view of the transmission cooler thermal bypass device of the present invention.
Figure 8:
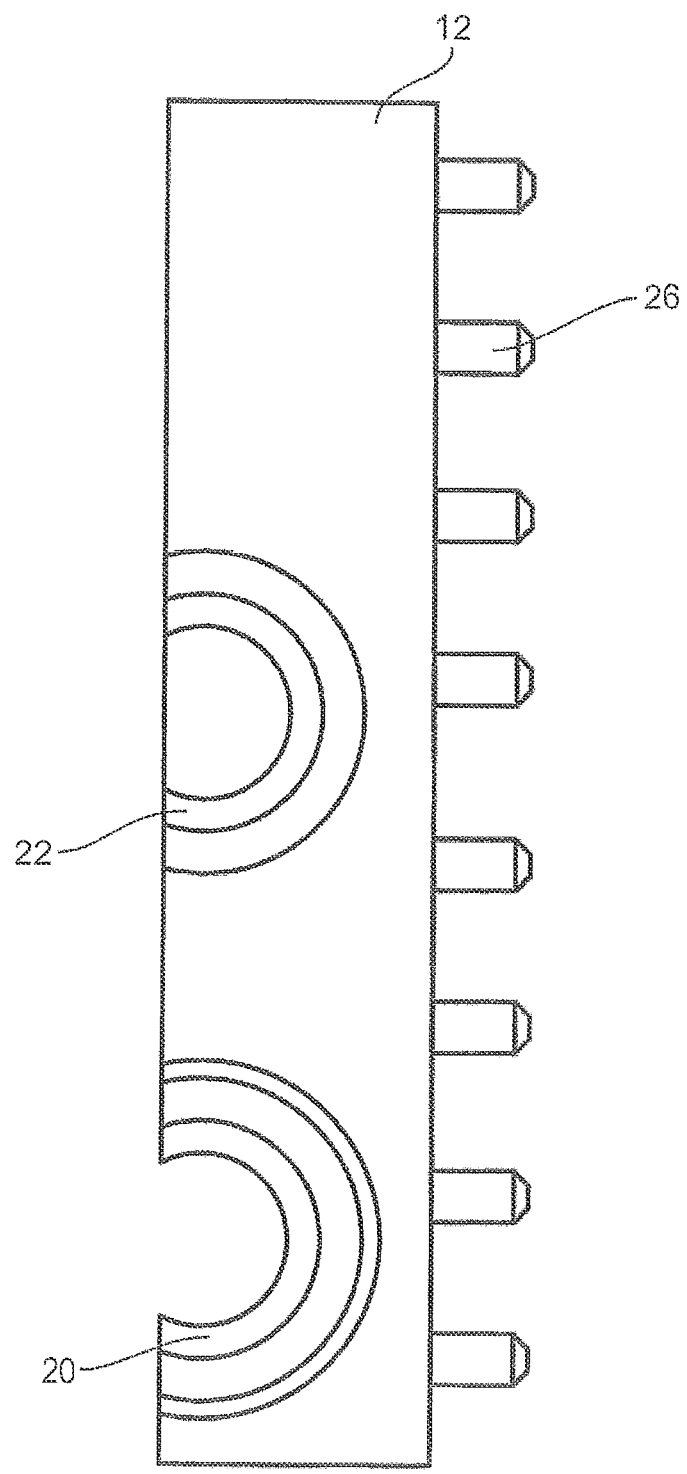
FIG. 8 is another side cut-away view of the transmission cooler thermal bypass device of the present invention.
Figure 9:
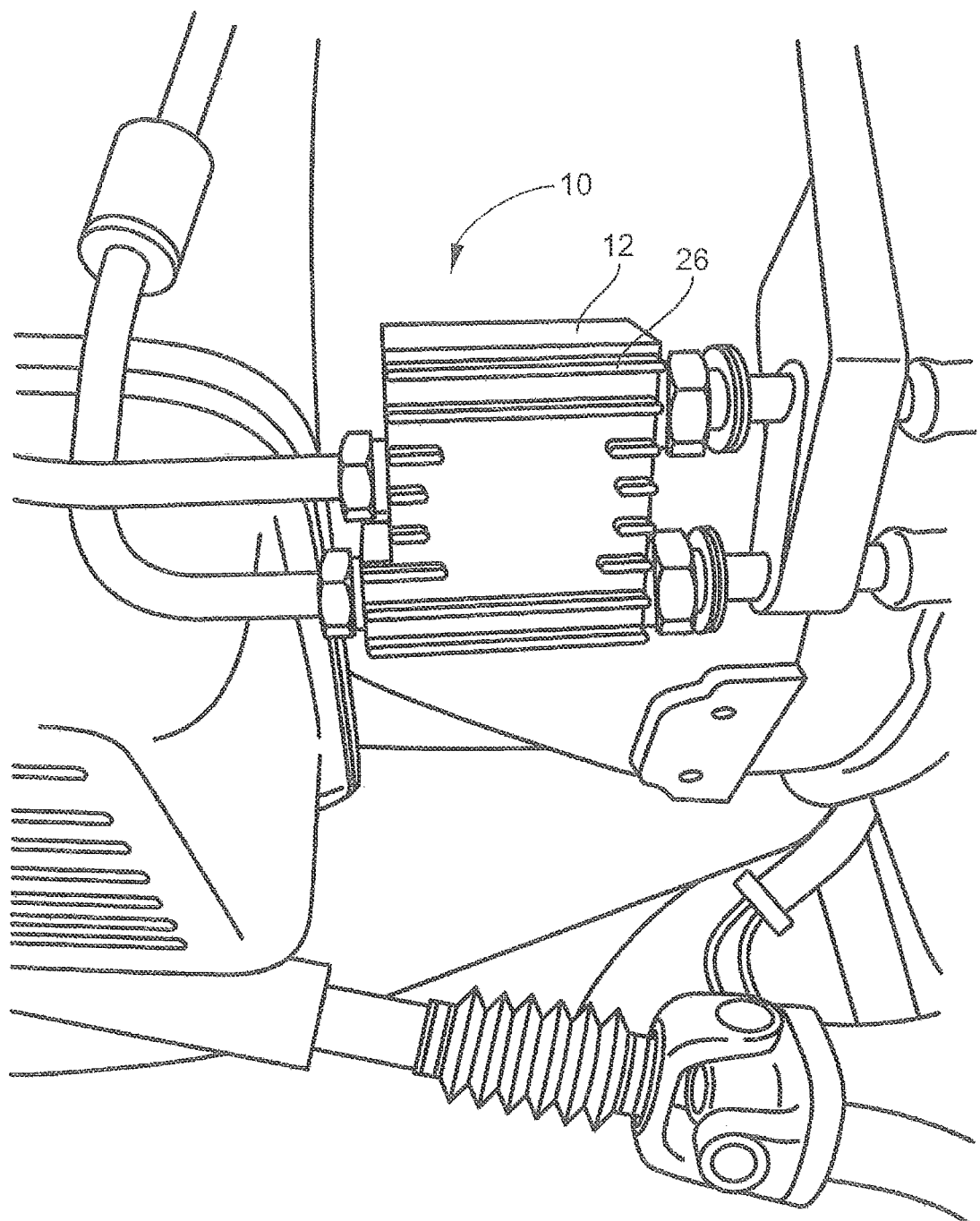
FIG. 9 is a perspective view of a transmission cooler thermal bypass device of the present invention installed.

Referring now specifically to the drawings, a transmission cooler thermal bypass device is illustrated in FIG. 4 and is shown generally at reference numeral 10. The transmission cooler thermal bypass device 10 has a body 12 that contains a front side, back side, top side, bottom side, a first end and a second end. and contains a first passageway 14 and a second passageway 16, as shown in FIG. 6. The transmission cooler thermal bypass device 10 also contains four openings (18, 20, 22, 24), wherein the first opening 18 and the second openings 20 are associated with the first passageway 14, and the third openings 22 and the fourth opening 24 are associated with the second passageway 16.

Each opening (18, 20, 22, 24) is disposed within the body 12 of the transmission cooler thermal bypass device 10, and is specifically disposed on the first end and the second end of the body 12 of the transmission cooler thermal bypass device 10. The first passageway 14 and the second passageway 16 extend through the body 12 from the first end to the second end.

The first opening 18 fluidly communicates with a heat source, such as a valve body and receives fluid from the heat source. The second opening 20 fluidly communicates with the fluid cooler input for depositing fluid to the cooler. The third opening 22 fluidly communicates with the fluid cooler and receives cooled fluid from the fluid cooler. The fourth opening 24 fluidly communicates with the heat source, such as a gear box, and returns fluid cooled to the heat source. Each opening may be internally threaded for receiving a correspondingly threaded hose or engagement device.

Figure 5:
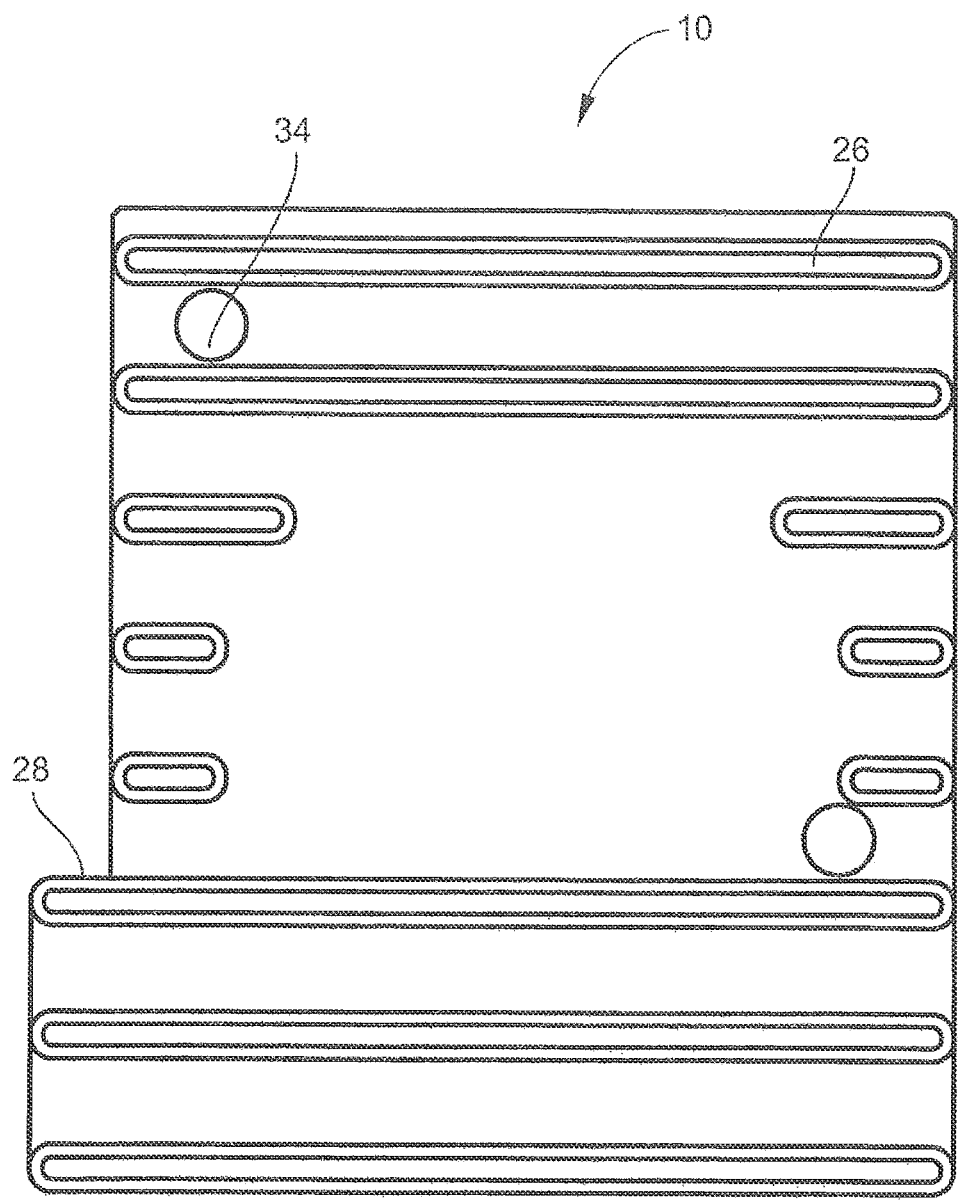
FIG. 5 is a front view of the transmission cooler thermal bypass device of the present invention.

As shown in FIGS. 4, 5, 7, 8, and 9, the front side of the body 12 contains a plurality of fins 26. The fins 26 extend from the outer surface of the front side of the body 12 and upwardly from the outer surface of the front side. As illustrated in FIGS. 4 and 5, the center portion of the front side of the body 12 may not contain any fins 26, just exposing the front side of the body 12. A company logo may be placed in the center portion that does not contain any fins 26. Adjacent the top side of the body 12, two fins 26 extend from one side of the front side of the body 12 to the other side of the front side of the body 12. Adjacent the bottom side of the body 12, two fins 26 extend from one side of the front side of the body 12 to the other side of the front side of the body 12. Between the two fins 26 adjacent the bottom side of the body 12 and the two fins 26 adjacent the top side of the body 12, smaller fins 26 are disposed adjacent the first end and the second end, wherein the center portion of the body 12 does not contain any fins 26.

The body 12 and fins 26 are preferably composed of steel. As shown in FIGS. 4, 5, 7, 8, and 9, the fins 26 are preferably spaced apart from each other, and most preferably spaced an equal distance apart from each other. As the fluid, flows through the first passageway 14 and second passageway 16, the fluid, especially the fluid flowing into the first opening 18 and into the first passageway will be at a high temperature. The heat of the fluid is conducted through the body 12 and through the fins 26. The heat is then transferred to the air flowing between the fins 26. The transmission cooler thermal bypass 10 assists with the heat transfer of the fluid flowing therein.

As shown in FIG. 6, the first passageway 14 extends from the first end to the second end of the body 12 and is a straight passageway. The first opening 18 and the second opening 20 of the first passageway are internally threaded and a first elongate passageway 14, formed within the body 12 extends along a straight line from the first opening 18 on the first end to the second opening 20 of the second end of the body 12. The first opening 18 and the second opening 20 are positioned opposite one another, wherein the first opening 18 is disposed within the first end, and the second opening 20 is disposed within the second end and directly across from each other.

The second passageway 16 extends from the first end to the second end of the body 12 and is angled upwards from the third opening 22 to the fourth opening 24. The third opening 22 and the fourth opening 24 are internally threated and an elongate second passageway 16 is formed within the body 12, extending from the first end to the second end of the body 12. The third opening 22 is disposed on the first end and the fourth opening 24 is disposed on the second end of the body 12. The third opening 22 and the fourth opening 24 are not positioned directly across from each other. Instead, the fourth opening 24 is positioned above or offset on the second end with respect to the location of the third opening on the third end, as shown in FIG. 6. Alternatively, the fourth opening 24 may be positioned on the second end at a position that is below the position of the third opening 22 on the first end of the body 12.

The second passageway 16 extends in a straight line for a predetermined length from the third opening 22. After a predetermined length, the second passageway 16 is angled towards the fourth opening 24. If the fourth opening 24 is positioned on the second end at a location above the position of the third opening 22 on the first end, the second passageway 16 is angled upwards towards the fourth opening after the predetermined length.

The length of the bottom side of the body 12 is greater than the length of the top side of the body 12. Specifically, the first end of the body 12, adjacent the bottom side of the body 12, has a greater length than the length of the top side of the body 12. The first passageway 14 is entirely contained within the bottom side of the body 12, resulting in the length of the first passageway 14 being greater than the length of the second passageway 16. As a result in the differing lengths of the bottom side of the body 12 and the top side of the body 14, a shelf 28 is formed on the first end of the body 12. The shelf 28 is preferably adjacent the second opening 20. The shelf 28 is formed at the point on the body 12 where the length of the bottom portion of the body 12 extends outward, creating a portion of the body 12 with a greater length than the rest of the body 12. As shown in FIG. 4, the edge of the shelf 28 on the front side of the body 12 may also be engaged to a side of a fin 26.

The transmission cooler thermal bypass device 10 may have a body 12 that is not a solid piece, but is split into two sections. In other words, the body 12 of the transmission cooler thermal bypass device 10 may be a solid, integral piece, or may be split into two portions, a first portion and a second portion. The first portion contains at least one bore 34, and preferably two or more bores 34, while the second portion also contains at least one bore 34, and preferably two or more bores 34. An engagement mechanism, such as a bolt screw or the like, is inserted into the bores 34 for securing the first portion and the second portion. In this arrangement, the openings (18, 20, 22, 24) and the first passageway 14 and the second passageway 16 may be located within either the first portion or the second portion, or alternatively a portion of the openings (18, 20, 22, 24) and the first passageway 14 and the second passageway 16 are disposed within the first portion and the second portion and mating the first portion to the second portion forms the entire openings (18, 20, 22, 24) and the first passageway 14 and the second passageway 16.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

The invention claimed is:

1. A transmission cooler thermal bypass device, comprising:
  a body having a front side, a back side, a top side, a bottom side, a first end, a second end, a first opening, a second opening, a third opening, and a fourth opening, the bottom side of the body has a length greater than the length of the top side of the body;
  a first passageway connecting the first opening and the second opening, the first passageway extending through the body from the first end to the second end;
  a second passageway connecting the third opening and the fourth opening, the second passageway is angled upwards from the third opening to the fourth opening, extending through the body from the first end to the second end;
  whereby the first passageway and the second passageway do not include a flow control valve.

2. The transmission cooler thermal bypass device according to claim 1, further comprising at least one fin.

3. The transmission cooler thermal bypass device according to claim 1, wherein the first opening, the second opening, the third opening, and the fourth opening are internally threaded.

4. The transmission cooler thermal bypass device according to claim 1, further comprising a plurality of fins.

5. The transmission cooler thermal bypass device according to claim 1, further comprising at least one fin extending from an outer surface of the first side of the body.

6. The transmission cooler thermal bypass device according to claim 1, further comprising a plurality of fins extending from an outer surface of the first side of the body.

7. A transmission cooler thermal bypass device, comprising:
  a body having a front side, a back side, a top side, a bottom side a first opening, a second opening, a third opening, and a fourth opening;
  a first passageway connecting the first opening and the second opening, the first passageway extending through the body from the first end to the second end;
  a second passageway connecting the third opening and the fourth opening, the second passageway extending through the body from the first end to the second end; and
  at least one fin extending from a side of the front side of the body to an opposite side of the front side of the body;
  whereby the first passageway and the second passageway do not include a flow control valve.

8. The transmission cooler thermal bypass device according to claim 7, wherein the first opening, the second opening, the third opening, and the fourth opening are internally threaded.

9. The transmission cooler thermal bypass device according to claim 7, wherein the second passageway is angled upwards from the third opening to the fourth opening.

10. The transmission cooler thermal bypass device according to claim 7, further comprising a plurality of fins.

11. The transmission cooler thermal bypass device according to claim 7, further comprising the at least one fin extends from an outer surface of the first side of the body.

12. The transmission cooler thermal bypass device according to claim 7, further comprising a plurality of fins extending from an outer surface of the first side of the body.

* * * * *